United States Patent [19]
Brewington

[11] Patent Number: 5,657,175
[45] Date of Patent: *Aug. 12, 1997

[54] REFLECTOR DEVICE FOR ALIGNING THE COMPLEMENTARY COMPONENTS OF A TRAILER HITCH

[76] Inventor: James D. Brewington, 9603 National Turnpike, Fairdale, Ky. 40118

[*] Notice: The portion of the term of this patent subsequent to Apr. 23, 2010, has been disclaimed.

[21] Appl. No.: 917,282

[22] Filed: Jul. 23, 1992

[51] Int. Cl.6 .................. G02B 5/08; G02B 7/182; B60D 1/36; B60R 1/06
[52] U.S. Cl. .................. 359/872; 359/881; 280/477; 248/479; 33/264
[58] Field of Search .................. 359/872, 874, 359/881; 248/476, 479, 480, 485, 486, 488; 33/264; 280/477

[56] References Cited

U.S. PATENT DOCUMENTS

| | | | |
|---|---|---|---|
| 1,918,802 | 7/1933 | Fleischer | 248/485 |
| 3,858,966 | 1/1975 | Lowell, Jr. | 359/881 |
| 4,158,451 | 6/1979 | Lukey | 248/479 |
| 4,163,606 | 8/1979 | Granno | 359/881 |
| 4,702,572 | 10/1987 | Cossey | 359/881 |
| 4,905,376 | 3/1990 | Neeley | 33/264 |
| 4,925,287 | 5/1990 | Lord et al. | 359/872 |
| 4,951,913 | 8/1990 | Quesada | 359/872 |
| 5,111,342 | 5/1992 | Quesada | 359/872 |
| 5,180,182 | 1/1993 | Haworth | 359/844 |

FOREIGN PATENT DOCUMENTS 0252073  11/1962  Australia .................. 359/881

*Primary Examiner*—Ricky D. Shafer

[57] ABSTRACT

A reflector device for providing the operator of a vehicle with a tailgate such as a pickup truck or a station wagon, convenient visual feedback as to the state of alignment of two complementary trailer hitch components (a first component mounted to the rear of the vehicle and a second component complementary to the first component mounted to the front of the trailer to be towed). The device has a mirror with its optical axis bisecting the angle formed by the vehicle operator's line of sight to the mirror and the optical path from the first trailer hitch component to the mirror. The mirror is pivotally mounted to the tailgate of the vehicle by a mounting bracket having a downwardly facing opening for receiving the top edge of the tailgate of the vehicle.

10 Claims, 5 Drawing Sheets

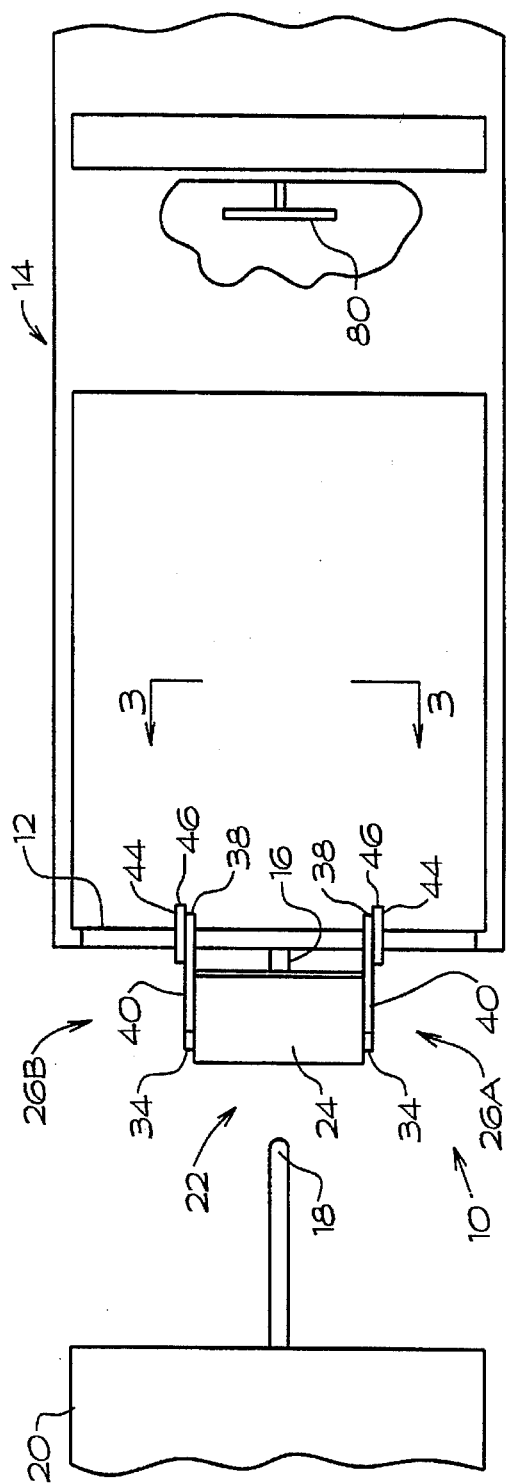
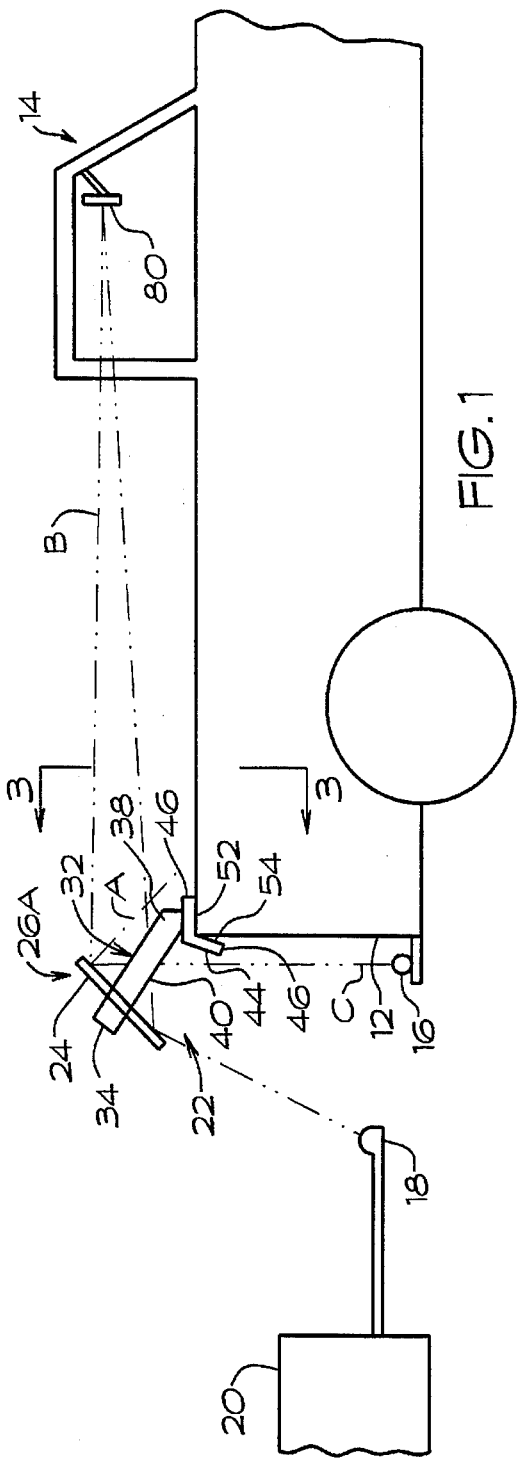

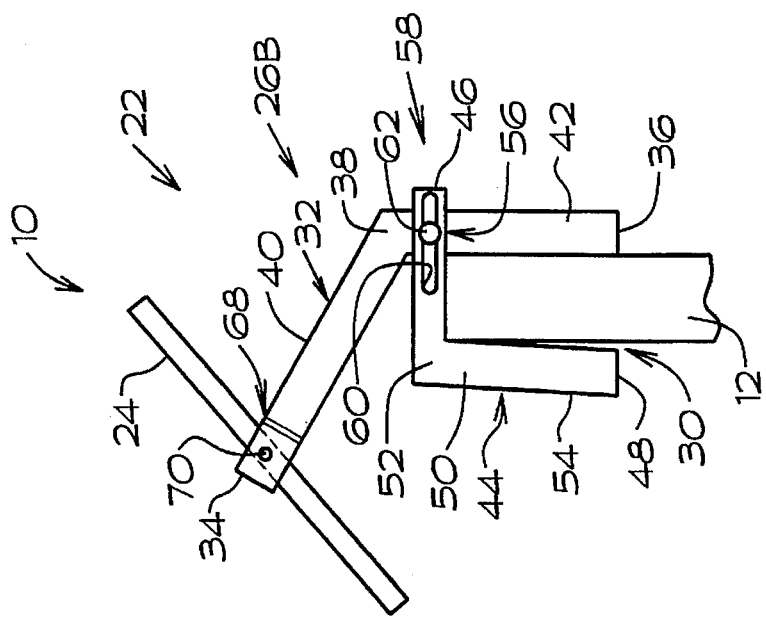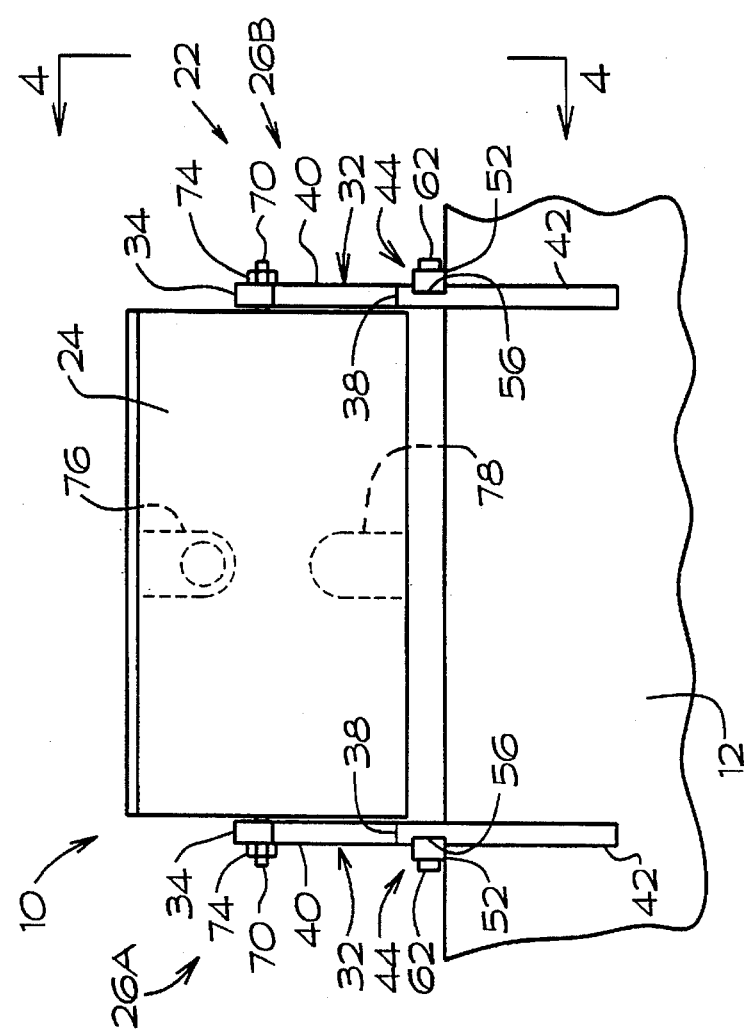

REFLECTOR DEVICE FOR ALIGNING THE COMPLEMENTARY COMPONENTS OF A TRAILER HITCH

BACKGROUND OF THE INVENTION

Trailer hitches using two complementary components (one attached to the towing vehicle and its complement attached to the trailer to be towed). Although these hitches (such as ball or ring hitches, for example) are easy to operate by a single person, the initial alignment of the two hitch components can prove to be difficult for usually the hitch components are obscured from the vehicle operator's view by the vehicle itself. As a result, the vehicle operator has to repeatedly exit the vehicle to check the alignment of the two hitch components, or the vehicle operator has to employ another person to take position outside the vehicle and direct the vehicle operator as to the appropriate action to align the trailer hitch components. Neither of these methods are as accurate or convenient as visual feedback while operating the vehicle.

Attempts have been made to provide the driver with means for viewing normally obstructed portions of the vehicle. Some, such as the device disclosed in U.S. Pat. No. 4,733,956 granted to Erickson are not designed for nor appropriate to trailer-hitch alignment as it is designed to view spaces interior to the vehicle. Other devices, such as the device of U.S. Pat. No. 3,767,292 granted to Ruthowski, that are designed specifically to aid in the alignment of trailer hitches suffer from the drawback of being attached to the trailer which requires the vehicle operator to align his vehicle with the device before the device can be used. The device further would either have to be constantly readjusted to compensate for varying operator positions in various vehicles or employ a convex mirror which would lead to dimensional distortions making alignment more difficult. Also, a separate unit would have to be produced for each trailer, raising total cost of manufacturing the device for multiple trailer applications.

SUMMARY OF THE INVENTION

The reflective device of the present invention provides a simple, low-cost device for allowing a vehicle operator to view (from the operating position of the vehicle) the normally obscured trailer hitch component attached to said vehicle. By being able to view the trailer hitch component of the vehicle while operating the vehicle, the vehicle operator can, alone, align the complementary trailer-hitch components if the vehicle and the trailer in a fashion that is quicker and more convenient than is conventionally achievable.

The device has a mirror with its optical axis bisecting the angle formed by the vehicle operator's line of sight to the mirror and the optical path from the first trailer hitch component to the mirror. The mirror is pivotally mounted to the tailgate of the vehicle by a mounting bracket having a downwardly facing opening for receiving the top edge of the tailgate of the vehicle.

BRIEF DESCRIPTION OF THE DRAWINGS

A better understanding of the present invention will be had upon reference to the following description in conjunction with the accompanying drawings, wherein like numerals refer to like components and in which:

FIG. 1 is a side view of a vehicle having the reflector device of the present invention mounted thereon;

FIG. 2 is a top view of the vehicle having the reflector device of the present invention mounted thereon;

FIG. 3 is an enlarged rearwardly-facing view as seen in the direction of arrows 3—3 in FIG. 1;

FIG. 4 is a side view as seen in the direction of arrows 4—4 in FIG. 3;

DETAILED DESCRIPTION OF THE PREFERRED EMBODIMENTS

Figure 5:
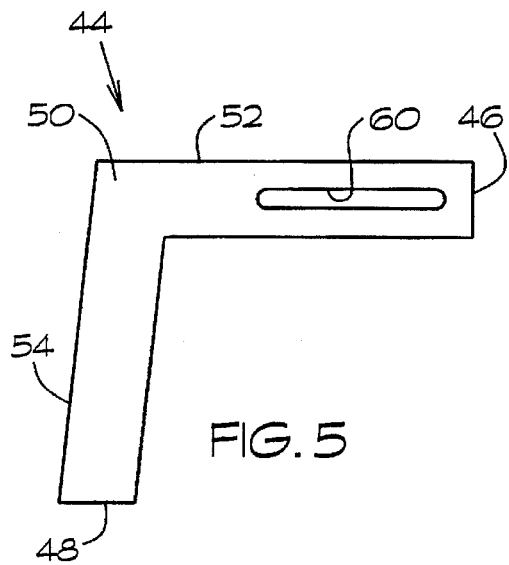
FIG. 5 is a side view of a component of the reflector device of the present invention.

With reference to FIGS. 1 through 5, there is shown the reflector device generally denoted as the number 10 removably mounted to the tailgate 12 of a vehicle 14. Such vehicles are known and include station wagons and (as shown) pickup trucks. The reflector device 10 provides, to the driver of the vehicle 14, visual feedback of the state of alignment of a first trailer-hitch component 16 mounted on the vehicle with a second trailer-hitch component 18 mounted on a trailer 20 to be towed. The type of trailer hitch is incidental for it does not comprise part of the invention. For the sake of illustration, however, the first trailer-hitch component 16 is ball and the second trailer-hitch component 18 is a socket complementary to and designed to receive the ball of the first trailer-hitch component 16.

The reflector device 10 comprises a bracket 22 to be mounted to the top edge of the tailgate 12 of the vehicle 14, and a mirror 24 pivotally attached to the bracket 22.

With continued reference to FIGS. 1 through 4, the bracket includes a first bracket assembly 26A and a second bracket assembly 26B, each being formed with a downwardly facing opening 30 for receiving the top edge of the tailgate 12 of the vehicle 14.

The first bracket assembly 26A and the second bracket assembly 26B are essentially identical in structure, therefore, for the sake of brevity and clearness of understanding, only one bracket assembly, denoted as the number 26, will be discussed in detail, it being understood that the description applies equally to the other bracket assembly and for this reason, identical numbers are used to denote identical elements of the bracket assemblies.

With reference to FIGS. 1 through 6, the bracket assembly 26 has a primary arm 32 having a proximal end 34 and a distal end 36 with an elbow 38 formed between the proximal end 34 and the distal end 36 defining a primary upper arm 40 and a primary forearm 42. The bracket assembly 26 also includes a secondary arm 44 having proximal end 46 and distal end 48 with an elbow 50 formed between the proximal end 46 and the distal end 48 defining a secondary upper arm 52 and a secondary forearm 54. The secondary arm 44 is movably attached to the primary arm 32 with the primary forearm 42 generally parallel to the secondary forearm 54. The cooperation of the primary forearm 42 and the secondary forearm 54 defines a jaw structure, wherein the primary forearm 42 is the stationary maxilla and the secondary forearm 54 is the mandible which is moveable relative to the maxilla primary forearm 42 (maxilla), and the downwardly facing opening 30 is defined therebetween. The movable attachment of the secondary arm 44 to the primary arm 32 comprises a channel 56 in the primary arm 32 generally transverse to the longitudinal axis of the primary forearm 42 for slidably receiving and guiding the secondary upper arm 52 defining the motion of the mandible relative to the maxilla.

The bracket assembly 26 further includes securing means 58 for securing the position of the secondary forearm 54 (mandible) relative to the primary forearm 42 (maxilla). The securing means comprises an elongated slot 60 formed in the secondary upper arm 52 having its longitudinal axis parallel to the longitudinal axis of the channel 56. The securing means 58 also has a fastener 62 attached to the primary arm 32 in the elongated channel 56 and received through the elongated slot 60 formed in the secondary upper arm 52. The fastener 62 can be a bolt secured to the primary arm 32 with the threaded shank protruding from the elongated slot 60 formed in the secondary upper arm 52 and a nut threaded over the protruding end of the threaded shank of the bolt. As the nut is threaded over the distal end of the bolt shank, the nut abuts the secondary upper arm 58 on either side of the elongated slot 60 and tightly clamps the secondary upper arm 58 into the channel 56 preventing movement of the secondary forearm 54 (mandible) relative to the primary forearm 42 (maxilla), thereby defining a fixed width for the downwardly-facing opening 30.

Figure 6:
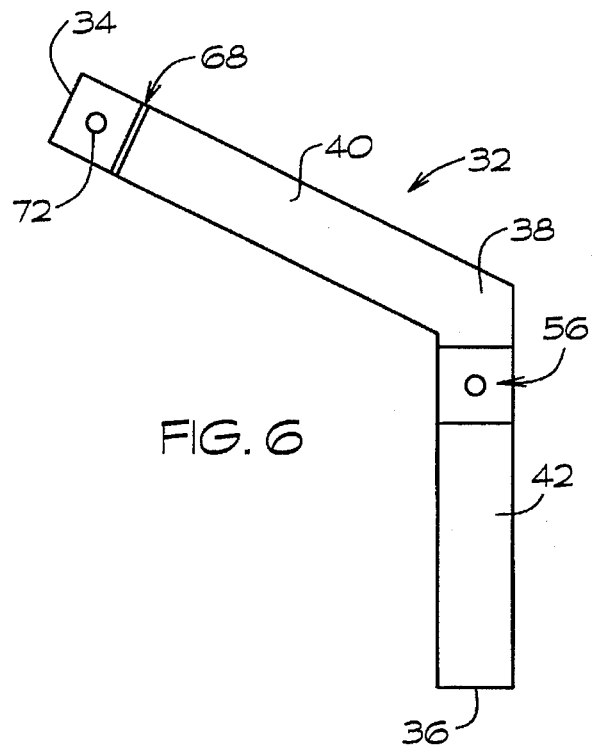
FIG. 6 is a side view of another component of the reflector device of the present invention.
Figure 7:
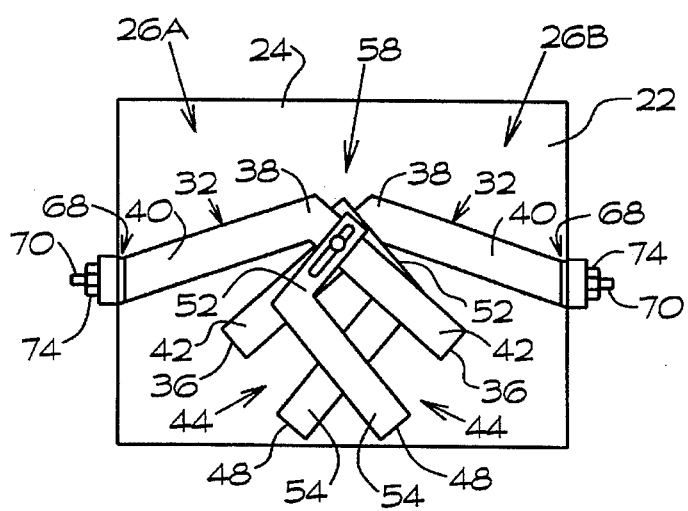
FIG. 7 is a front view of the reflector device of the present invention removed from the vehicle and configured for storage.

With reference to FIGS. 4, 6 and 7, each of the bracket assemblies 26 has an articulation means 68 providing for movement of the bracket assembly 26 relative to the mirror 24 allowing the bracket assembly 26 to be configured for storage (see FIG. 7), wherein the bracket assembly 26 is in overlaying relationship to the mirror 24 or configured for use (see FIGS. 4 and 6), wherein the bracket assembly 26 projects from the mirror 24. The articulation means is shown as a hinge joint formed in the primary upper arm 40 generally adjacent to the proximal end 34 of the primary arm 32 with the pivotal axis transverse to the longitudinal axis of the primary upper arm 40.

With reference to FIGS. 1 through 4 and 7, the mirror 24 is received between the first bracket assembly 26A and the second bracket assembly 26B at the proximal ends 34 of each of the primary arms 32. The pivotal attachment of the mirror 24 to each bracket assembly 26 is an axle 70 secured to the mirror 24 and received in and protruding through an appropriate aperture 72 formed near the proximal end 34 of the primary arm 32 and perpendicular to the longitudinal axis of the primary upper arm 40. The protruding end of the axle 70 is threaded for receiving a nut 74 for securing the mirror 24 to the bracket assembly 26 in a fixed angular orientation.

With continued reference to FIGS. 1 through 4, there is shown the reflector device 10 mounted to the tailgate 12 of the vehicle 14 in use for aligning the first trailer-hitch component 16 with the second trailer-hitch component 18. The reflector device 10 is mounted on the tailgate 12 in lateral alignment with the first trailer-hitch component 16. The annular orientation of the mirror 24 is adjusted so that the optical axis A of the mirror 24 bisects the angle formed by the vehicle operator's line of sight B to the mirror 24 and the optical path C from the first trailer-hitch component 16 to the mirror 24, thereby providing the reflected image 76 of the first trailer-hitch component 16 in the mirror 24.

Figure 8:
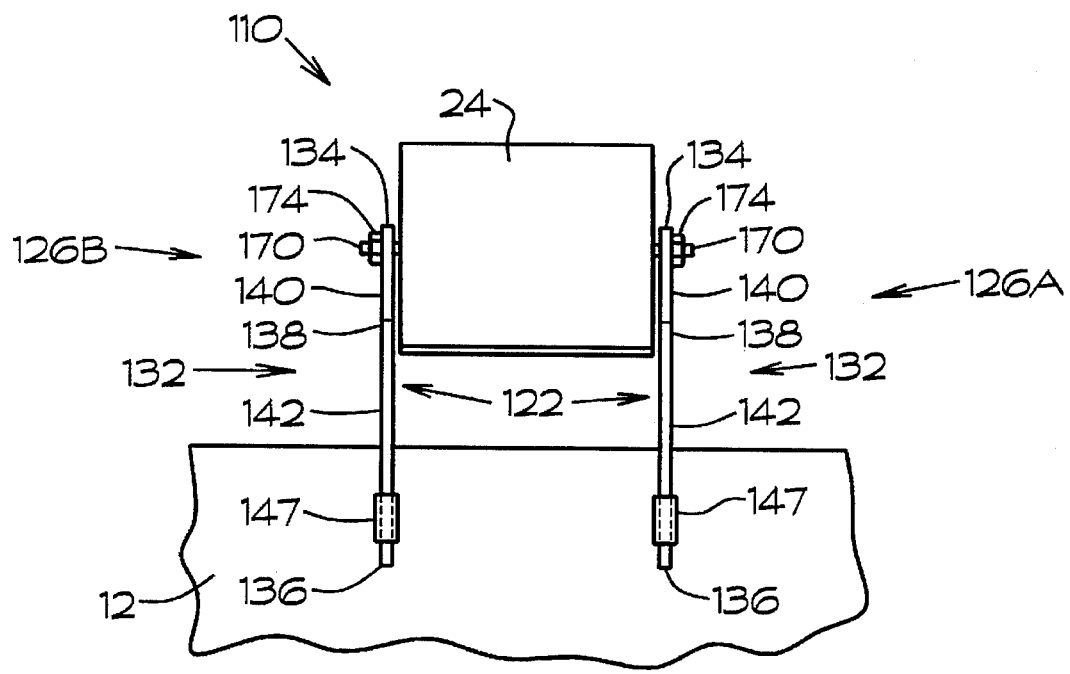
FIG. 8 is a front facing view of another embodiment of the present invention mounted on a vehicle.
Figure 9:
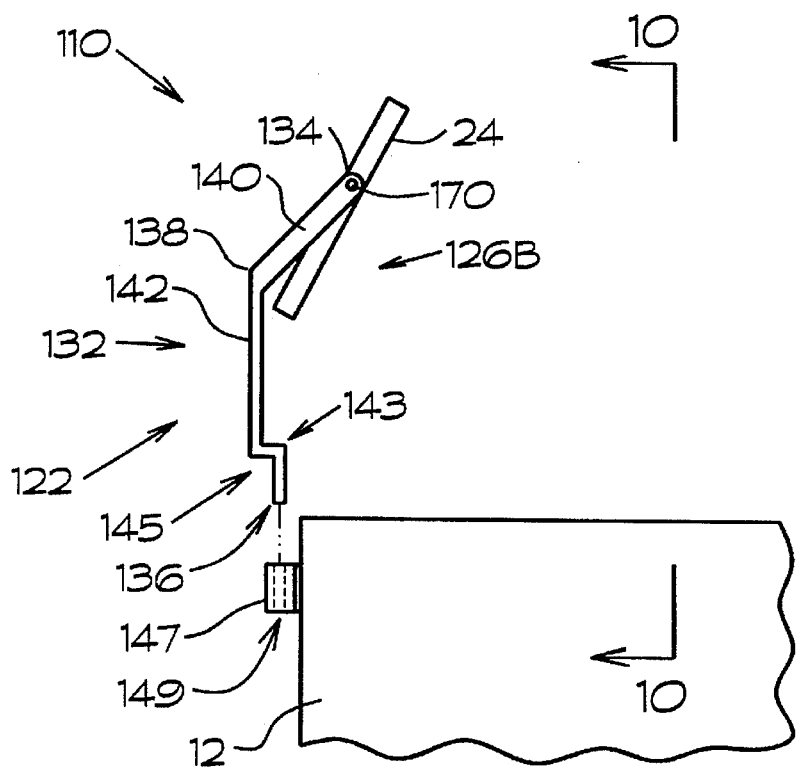
FIG. 9 is a side view of the embodiment of the present invention shown in FIG. 8 removed from the vehicle; and, FIG. 10 is a front view of the embodiment of FIG. 9 as seen in the direction of the arrows 10—10 in FIG. 9.
Figure 10:
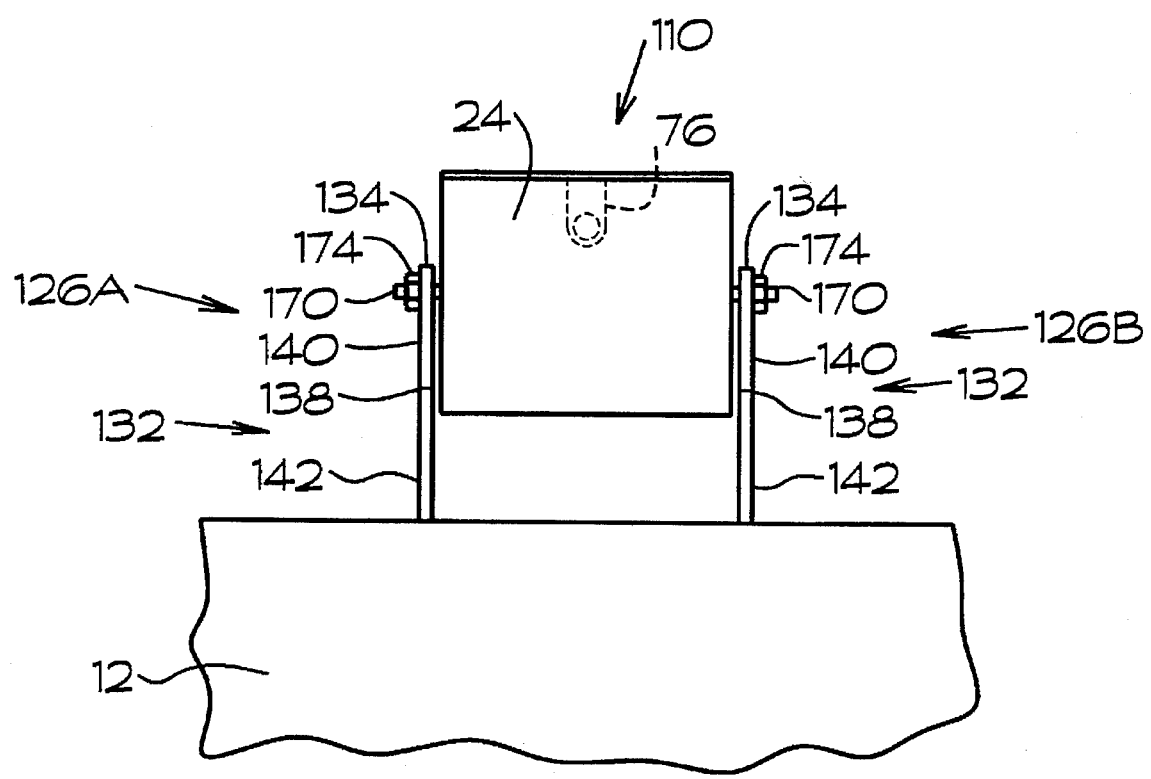

Now with reference to FIGS. 8 through 10, there is shown another embodiment of the reflector device 110 removably mounted to the tailgate 12 of a vehicle 14.

The reflector device comprises a bracket 122 to be removably attached to the tailgate 12, and a mirror 124 pivotally attached to the bracket 122.

The bracket 122 includes a first bracket assembly 126A and a second bracket assembly 126B. The first bracket assembly 126A and second bracket assembly 126B are essentially identical in structure, therefore, only one bracket assembly 126 will be discussed in detail, it being understood that the description applies equally to the other bracket assembly, and for this reason, identical numbers are used to denote identical elements of the bracket assemblies.

The bracket assembly 126 comprises a rod member 132 having a proximal end 134 and a distal end 136 with an elbow 138 formed between the proximal end 134 and the distal end 136 defining an upper arm 140 and a forearm 142. Further, the rod member 132 includes a mounting rod end 145 defined by a double bend 143 formed between the elbow 138 and distal end 136 so that the mounting rod end 145 adjacent the distal end 136 is parallel to and offset from the length of the forearm 142 between the double bend 143 and elbow 138. The mounting rod end 145 is offset toward the upper arm 140 side of the rod member 132.

The mirror 24 is received between the first bracket assembly 126A and the second bracket assembly 126B at the proximal ends 134 of each of the rod members 132. The pivotal attachment of the mirror 24 to each bracket assembly 126 is an axle 170 secured to the mirror 24 and received in and protruding through an appropriate aperture formed near the proximal end 134 of the upper arm 140. The protruding end of the axle 170 is threaded for receiving a nut 174 for securing the mirror 24 to the bracket assembly 126 in a fixed angular orientation.

The reflector device 110 is removably mounted to the tailgate 12 using bracket mounts 147 on the tailgate 12 for receiving the mounting ends 145 of the bracket assemblies 126. The bracket mounts 147 are shown as two identical spaced-apart fixtures each formed with a bore 149 for receiving the mounting end 145 of a bracket assembly 126. The bracket mount fixtures 147 are affixed to the tailgate with the bores 149 generally vertical and are equally spaced to either side of the centerline of the vehicle 12, i.e. equally spaced to either side of the first trailer-hitch component 16. Alternatively, it is contemplated that the bracket mounts 147 could be defined by a hole formed in the vertical panel of the tailgate 12.

To mount the reflector device 122 to the tailgate 12, the mounting end 145 of each bracket assembly 126A, 126B is each coaxially received in the bore 149 of a different one of the bracket mount fixtures 147.

The vehicle operator can then maneuver the vehicle 14 to bring the first trailer-hitch component 16 in alignment with the second trailer-hitch component 18. As the first trailer-hitch component 16 closely approaches the second trailer-hitch component 18, a reflected image 78 of the second trailer-hitch component 18 becomes visible in the mirror 24 allow final alignment of the first trailer-hitch component 16 to the second trailer-hitch component 18 by aligning the reflected image 76 of the first trailer-hitch component 16 with the reflected image 78 of the second trailer-hitch component 18 (see example, FIG. 3).

The vehicle operator can see the mirror 24 of the reflector device 10. 110 either through the rear-view mirror 80 of the vehicle 14, or merely by turning his head to look directly at the mirror 24 of the reflector device 10, 110.

It is anticipated that the mirror 24 of the reflector device 10, 110 could have special optical properties such as, for example, a convex reflective surface (or convex portion thereof) giving a wider field of view than a flat-plain mirror.

The foregoing detailed description is given primarily for clearness of understanding and no unnecessary limitations are to be understood therefrom for modifications will become obvious to those skilled in the art upon reading this disclosure and may be made without departing from the scope of the inventions or scope of the appended claims.

What is claimed is:

1. A reflector device to be removably attached to a tailgate of a vehicle providing to a vehicle operator visual feedback of the state of alignment of a first trailer-hitch component mounted on the vehicle with a second trailer-hitch component mounted on a trailer to be towed, comprising:

a mirror reflector;

a bracket comprising two spaced-apart bracket assemblies, each of said bracket assemblies having a proximal end rotatably connecting to said mirror reflector and a distal end forming a downwardly-facing opening for receiving the top edge of the closed tailgate being formed at the distal end of each of said bracket assemblies by a primary arm having an elbow between said proximal end and said distal end dividing said primary arm into a primary upper arm and a primary forearm, a secondary arm having an elbow between said proximal end and said distal end dividing said secondary arm into a secondary upper arm and a secondary forearm, said downwardly facing opening being defined between said primary forearm and said secondary forearm;

means for pivoting connecting said bracket assemblies with said mirror reflector for folding said bracket assemblies from a generally flat storage configuration wherein each of said bracket assemblies is in overlaying relationship with said mirror reflector to an in-use configuration, wherein each of said bracket assemblies projects from said mirror reflector at an angle for attaching said bracket to a tailgate;

said mirror reflector being disposed between the two spaced-apart bracket assemblies and pivotally attached to the proximal end of each of the bracket assemblies, so that when the reflector device is attached to the vehicle tailgate, the optical axis of said mirror reflector faces generally in a forward and downward direction so that the trailer-hitch component on the vehicle is visible to the vehicle driver in said mirror reflector.

2. The device of claim 1, further comprising means for adjusting the width of said downwardly facing opening between said primary forearm and said secondary forearm.

3. The device of claim 2, wherein said means for adjusting the width of said downwardly facing opening comprises means for movably attaching said secondary arm to said primary arm.

4. The device of claim 3, wherein said means for movably attaching said secondary arm to said primary arm comprises a channel formed in said primary arm generally transverse to the longitudinal axis of said primary forearm slidably receiving and guiding said secondary upper arm of said secondary arm.

5. The device of claim 4, further comprising securing means for securing the position of said secondary upper arm in said channel.

6. A reflector device to be removably attached to a tailgate of a vehicle providing to a vehicle operator visual feedback of the state of alignment of a first trailer-hitch component mounted on the vehicle with a second trailer-hitch component mounted on a trailer to be towed, comprising:

a mirror reflector;

a bracket comprising two spaced-apart bracket assemblies, each of said bracket assemblies having a proximal end rotatably connecting to said mirror reflector and a distal end forming a downwardly-facing opening for receiving the top edge of the closed tailgate being formed at the distal end of each of said bracket assemblies, each of said bracket assemblies comprising a primary arm having an elbow between said proximal end and said distal end dividing said primary arm into a primary upper arm and a primary forearm, a secondary arm having an elbow between said proximal end and said distal end dividing said secondary arm into a secondary upper arm and a secondary forearm, and said downwardly facing opening being defined between said primary forearm and said secondary forearm;

means associated with said bracket for attaching said bracket to the tailgate; and said mirror reflector being disposed between the two spaced-apart bracket assemblies and pivotally attached to the proximal end of each of the bracket assemblies, so that when the reflector device is attached to the vehicle tailgate, the optical axis of said mirror reflector faces generally in a forward and downward direction so that the trailer-hitch component on the vehicle is visible to the vehicle driver in said mirror reflector.

7. The device of claim 6, further comprising means for adjusting the width of said downwardly facing opening between said primary forearm and said secondary forearm.

8. The device of claim 7, wherein said means for adjusting the width of said downwardly facing opening comprises means for movably attaching said secondary arm to said primary arm.

9. The device of claim 8, wherein said means for movably attaching said secondary arm to said primary arm comprises a channel formed in said primary arm generally transverse to the longitudinal axis of said primary forearm slidably receiving and guiding said secondary upper arm of said secondary arm.

10. The device of claim 9, further comprising securing means for securing the position of said secondary upper arm in said channel.

* * * * *